(12) United States Patent
Eichhorn

(10) Patent No.: US 6,619,713 B2
(45) Date of Patent: Sep. 16, 2003

(54) SLIDE-OUT ROOM MECHANISM

(75) Inventor: Mark Eichhorn, Mishawaka, IN (US)

(73) Assignee: Days Corporation, Elkhart, IN (US)

( * ) Notice: Subject to any disclaimer, the term of this patent is extended or adjusted under 35 U.S.C. 154(b) by 26 days.

(21) Appl. No.: 10/145,849

(22) Filed: May 14, 2002

(65) Prior Publication Data

US 2002/0171255 A1 Nov. 21, 2002

Related U.S. Application Data

(60) Provisional application No. 60/304,802, filed on Jul. 11, 2001, and provisional application No. 60/291,500, filed on May 15, 2001.

(51) Int. Cl.[7] ................................................. B06P 3/34
(52) U.S. Cl. ............................... 296/26.01; 296/26.13; 296/175; 52/67
(58) Field of Search ................................. 296/156, 165, 296/171, 172, 173, 175, 26.12, 26.13, 26.09, 26.01; 52/67

(56) References Cited

U.S. PATENT DOCUMENTS

| | | | |
|---|---|---|---|
| 4,515,296 A | 5/1985 | Surdilla | |
| 5,237,782 A | 8/1993 | Cooper | |
| 5,570,924 A | 11/1996 | Few et al. | |
| 5,636,394 A | 6/1997 | Bartley | |
| 5,758,918 A | 6/1998 | Schneider et al. | |
| 5,833,296 A | 11/1998 | Schneider | |
| 5,894,698 A | 4/1999 | Dewald, Jr. et al. | |
| 5,902,001 A | 5/1999 | Schneider | |
| 6,108,983 A | 8/2000 | Dewald, Jr. et al. | |
| 6,109,983 A | 8/2000 | Becker et al. | |
| 6,116,671 A | * 9/2000 | Schneider | ................ 296/26.01 |
| 6,202,362 B1 | 3/2001 | McManus et al. | |
| 6,227,601 B1 | 5/2001 | LaFrance | |
| 6,428,073 B1 | * 8/2002 | Blodgett, Jr. | |

* cited by examiner

Primary Examiner—Stepehn T. Gordon
Assistant Examiner—Patricia Engle
(74) Attorney, Agent, or Firm—Barnes & Thornburg

(57) ABSTRACT

A vehicle having an expandable slide-out body is provided. The slide-out body is movable relative to the vehicle by a slide-out apparatus. The slide-out apparatus has first and second rails, and first and second synchronization members. The first rail is attached to the vehicle and defines a first longitudinally-extending compartment. The second rail also has a second longitudinally-extending compartment. The second rail is attached to the slide-out body, and is disposed within and movable relative to the first longitudinally-extending compartment. The first synchronization member is attached to the second rail. The second synchronization member is located inside the second longitudinally-extending compartment and is engagable with the first synchronization member.

18 Claims, 3 Drawing Sheets

SLIDE-OUT ROOM MECHANISM

RELATED APPLICATIONS

The present disclosure is related to and claims priority to U.S. Provisional Patent Application Ser. No. 60/291,500 (filed May 15, 2001) and U.S. Provisional Patent Application Ser. No. 60/304,802 (filed Jul. 11, 2001), the complete disclosures of all of these applications are hereby expressly incorporated into the present application.

BACKGROUND

The present invention is related to vehicles, and, more particularly to slide-out sections for use with such vehicles, as well as mechanisms to move the slide-out sections between use and stowed positions.

Vehicles such as recreational vehicles, trailers (commonly referred to as "fifth wheels"), mobile homes, manufactured houses, campers, and the like often have retractable or "slide-out" rooms or sections. Slide-out sections are compartments that selectively increase the living or storage portions of the vehicle. Specifically, during transit the slide-out section is located in a retracted stowed position such that its exterior wall forms a portion of the exterior of the vehicle. Because of width restrictions on public roads, this section is retracted during transit so that it does not increase the width of the vehicle. Conversely, when the vehicle is parked, the slide-out section can be extended outwardly from the vehicle to the use position, thereby providing the increased living or storage space.

Because the slide-out section is required to move between the use and stowed positions, a slide-out mechanism is provided to facilitate such movement. But vehicles having such slide-out sections and corresponding slide-out mechanisms, however, often require substantial amounts of the vehicle to be devoted to these structures. In particular regards to the vertical spacing, the slide-out mechanism often shares space with the frame of the vehicle, along with ductwork, mechanical systems, and storage space which are all typically located below the slide-out section. Such space, particularly in the vertical plane, is, therefore, often a premium. Accordingly, reducing the amount of occupied vertical space by the slide-out mechanism is beneficial. Minimizing such vertical space occupied by the slide-out mechanism allows for more space to be available for the slide-out section, ductwork, or storage space.

Accordingly, an illustrative embodiment of the present disclosure provides a vehicle having an expandable slide-out body. The slide-out body is movable relative to the vehicle by a slide-out apparatus. The slide-out apparatus comprises first and second rails, and first and second synchronization members. The first rail is attached to the vehicle and defines a first longitudinally-extending compartment. The second rail also has a second longitudinally-extending compartment. The second rail is attached to the slide-out body, and is disposed within and movable relative to the first longitudinally-extending compartment The first synchronization member is attached to the second rail. The second synchronization member is located inside the second longitudinally-extending compartment and is engagable with the first synchronization member.

Further embodiments of the illustrative vehicle may comprise the first synchronization member being attached longitudinally to the second longitudinally-extending compartment; the first synchronization member being a rack; the second synchronization member being a gear located inside the second longitudinally-extending compartment; the gear having an axis of rotation that intersects the first rail; and the second rail comprising a longitudinally-extending opening configured to receive a timing member that is attached to the second synchronization member.

Another illustrative embodiment of the present disclosure also provides a vehicle having an expandable slide-out body. The slide-out body is also movable relative to the vehicle by a slide-out apparatus. The slide-out apparatus comprises first and second rails, and a synchronization assembly. The first rail has a first longitudinally-extending tubular compartment and is attached to the vehicle. The second rail is attached to the slide-out body, and is disposed within and movable relative to the first longitudinally-extending tubular compartment. The second rail has a second longitudinally-extending tubular compartment defined by longitudinally-extending spaced-apart upper and lower walls. The synchronization assembly is located within the second longitudinally-extending tubular compartment between the upper and lower walls.

Further embodiments of the illustrative vehicle may comprise the synchronization assembly comprising a corresponding rack and a pinion; the rack being attached longitudinally to the second rail, and the pinion being rotatable and engagable with the rack and moving same as the pinion rotates; the pinion having an axis of rotation that intersects the first rail; and a timing member extending into the first and second rails, and being attached to at least a portion of the synchronization assembly.

Another illustrative embodiment of the present disclosure also provides a vehicle having an expandable slide-out body. The slide-out body is also movable relative to the vehicle by a slide-out apparatus. The slide-out apparatus comprises a plurality of first and second rails, a plurality of first and second synchronization members, and a timing member. The plurality of first rails are each attached to the vehicle. In addition, each of the plurality of first rails have a first longitudinally-extending compartment. The plurality of second rails each have a second longitudinally-extending compartment. Each of the plurality of second rails is attached to the slide-out body and disposed within and movable relative to one of the second longitudinally-extending compartments of each of the plurality of first rails. The plurality of first synchronization members are each attached to the second longitudinally-extending compartment of each of the second rails. The plurality of second synchronization members are each located inside each of the second longitudinally-extending compartments, and each is engagable with the at least one of the first synchronization members. The timing member is attached to each of the plurality of second synchronization members.

Further embodiments of the illustrative vehicle may comprise the timing member defining a longitudinal axis which intersects at least one of the first rails; each of the first synchronization members being racks; each of the plurality of second synchronization members being rotatable pinions; the timing member being attached to each of the rotatable pinions such that as each of the pinions rotate, they each engage one of the racks, causing the second rail to move relative to the first rail; the timing member causes each of the pinions to move concurrently; the timing member being disposed through each of the first rails; each of the pinions being located entirely in one of the second longitudinally-extending compartments of each of the plurality of second rails; and the timing member extending into a longitudinally-extending slot disposed in each of the plurality of second rails to provide access to the second longitudinally-extending compartments.

Additional features and advantages of the vehicle and slide-out apparatus will become apparent to those skilled in the art upon consideration of the following detailed description of the illustrated embodiment exemplifying the best mode of carrying out the vehicle and slide-out apparatus as presently perceived.

BRIEF DESCRIPTION OF DRAWINGS

The present disclosure will be described hereafter with reference to the attached drawings which are given as non-limiting examples only, in which.

Figure 1:
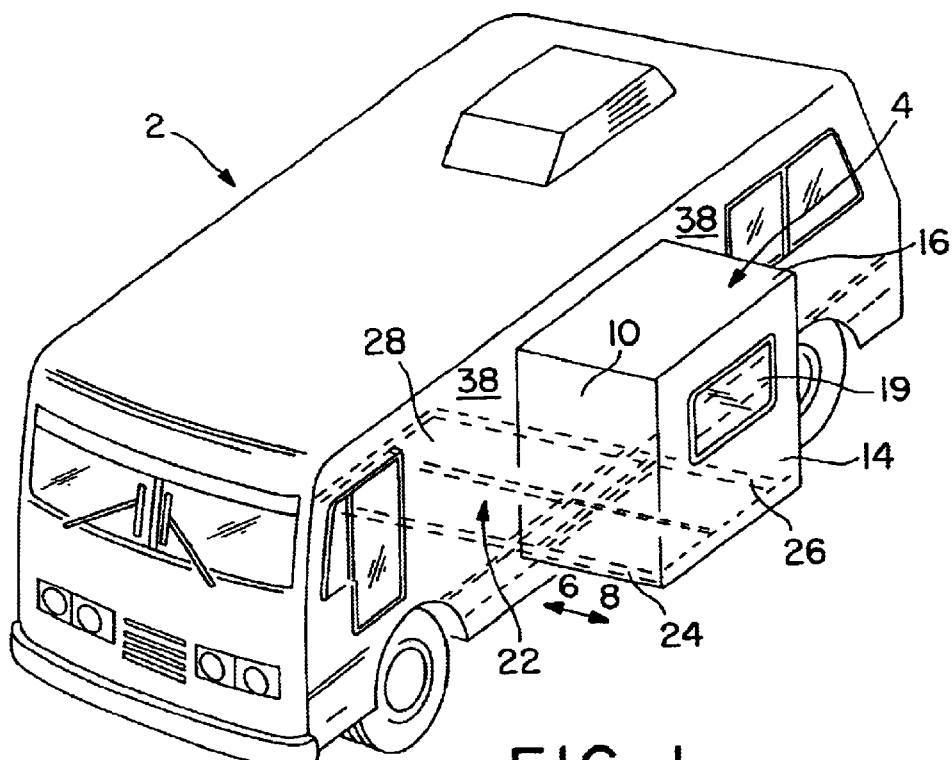
FIG. 1 is a perspective view of a vehicle incorporating a slide-out room movably attached thereto by a slide-out mechanism.

Corresponding reference characters indicate corresponding parts throughout the several views. The exemplification set out herein illustrates embodiments of the vehicle and slide-out apparatus, and such exemplification is not to be construed as limiting the scope of the vehicle and slide-out apparatus in any manner.

DETAILED DESCRIPTION OF THE DRAWINGS

Figure 2:
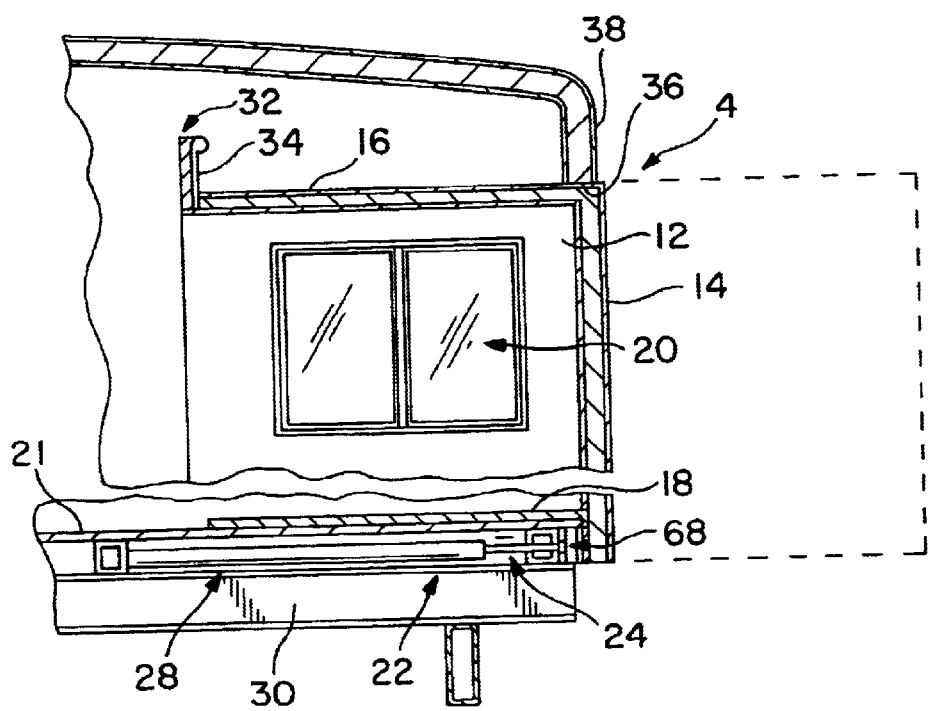
FIG. 2 is a front sectional view of a portion of the vehicle, slide-out room, and slide-out mechanism of FIG. 1.

A perspective view of a vehicle 2, illustratively a recreational vehicle, is shown in FIG. 1. Vehicle 2 includes a slide-out room or section 4 which provides additional inside living or storage space therein. Such slide-out section is movable in directions 6 and 8 between an extended use position, as shown in FIG. 1, and a retracted stowed position, as shown in FIG. 2. As evident in FIG. 1, the slide-out section located in the use position substantially increases the available living or storage space. The slide-out section 4 retracted in the stowed position, as shown in FIG. 2, reduces the width of vehicle 2, allowing the same to travel. Slide-out section 4 is of illustrative size and dimension, having a pair of front and rear walls 10, 12, a side-wall 14, a roof 16, flooring 18, and sub-flooring 21, and a plurality of windows 19, 20. It is appreciated that the type of vehicle, as well as the specific type of slide-out section, shown herein is for illustrative purposes only. It is contemplated that any type of vehicle, particularly those commonly known by those skilled in the art, requiring an expandable space is contemplated to be within the scope of this disclosure.

A slide-out mechanism or assembly 22 is illustratively located beneath the slide-out section 4. Slide-out assembly 22 controls the movement of slide-out section 4 in directions 6, 8 between extended and retracted positions. To accomplish this, a plurality of substantially parallely-spaced telescoping assemblies 24, 26 are attached to slide-out section 4 and are extendable from a stationary frame 28. Frame 28 is attached to vehicle 2, illustratively at chassis member 30 and sub-flooring 21, so that as telescoping assemblies 24, 26 move slide-out section 4 relative to frame 28, slide-out section 4 also moves relative to chassis member 30 and, hence vehicle 2. A controller (not shown) typically located in the driver compartment of vehicle 2 is used to selectively activate slide-out mechanism 22 for moving slide-out section 4 in directions 6, 8. As also illustratively shown in FIG. 2, slide-out section 4 comprises a stop 32 and sealing members 34, 36 to maintain a seal between the slide-out section 4 and the outer wall 38 of vehicle 2.

Figure 3:
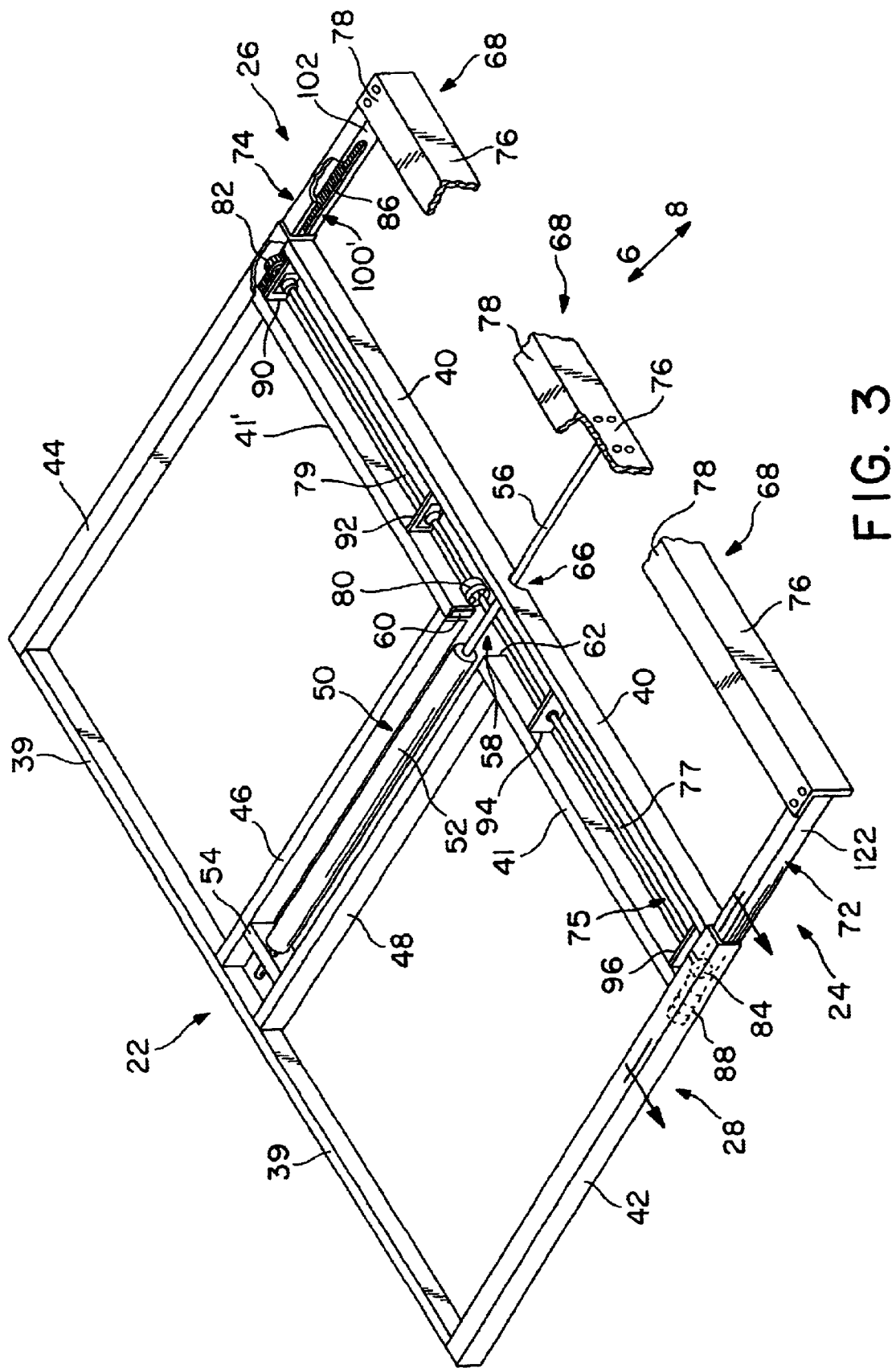
FIG. 3 is a perspective view of the slide-out mechanism of FIG. 1.

A perspective view of slide-out mechanism 22 is shown in FIG. 3. The stationary frame 28 portion of mechanism 22 illustratively comprises cross-members 39, 40 and 41, 41' are generally parallely-spaced apart and are each interposed between outer tubes 42, 44, forming a rectangular structure as shown. The stationary frame 28 is illustratively made from steel or other material sufficient to carry substantial weight, like the slide-out section 4. The outer tubes 44, 42 are, too, generally parallely-spaced apart and fixed to frame 28 by cross-members 39, 40, and 41, 41'. Inner supports 46, 48 are also positioned generally parallel to outer tubes 42, 44 and are interposed between cross-members 39, 40 and 41, 41' respectively. It is appreciated that all of these structures may be attached to each other via bolts, fasteners, weldings, or the like.

It is contemplated that inner supports 46, 48 not only provide additional structural support to frame 28, but they may also accommodate hydraulic actuator assembly 50 illustratively disposed therebetween. Actuator assembly 50 comprises a cylinder 52 that is attached to a cross-support 54 at a distal end, and has a movable fluid actuated piston rod 56 movably extendable from a proximal end. Piston rod 56 extends through space 58 located between the ends 60, 62, of cross-members 41, 41' respectively. A notch 66 is formed illustratively on the lower side of cross-member 40 and configured to receive parallely-spaced piston rod 56. It is appreciated that the hydraulic actuator assembly 50, as depicted herein, is for illustrative purposes only. Other actuators, like an electric or pneumatic actuator, for example, may also be used. It is also contemplated that the actuator assembly 50 can be located anywhere relative to the slide-out assembly 4 so long as it can move the slide-out section 4 relative to the vehicle 2.

A cross-bracket 68 is attached to piston rod 56 as well as to inner-telescoping members 72, 74. Bracket 68 is illustratively formed into side and top portions 76, 78, respectively, such that piston rod 56 is attached to the side portion 76 and members 72, 74 are attached to both portions 76, 78, as well. Accordingly, slide-out section 4 is attached to bracket 68, so that as inner-telescoping members 72, 74 move bracket 68, they also move slide-out section 4 relative to vehicle 2. It is contemplated that bracket 68 can be of any size or configuration suitable to attach to and manipulate any slide-out, like slide-out section 4, for example. It is also contemplated that bracket 68 may be replaced with fasteners that secure directly to the slide-out section.

Inner telescoping members 72, 74 are located within and movable relative to outer tubes 42, 44, respectfully. Specifically as shown in FIG. 3, inner telescoping members 72, 74 are shown in an extended position relative to frame 28. In an illustrative embodiment, outer tubes 42, 44 comprise hollow cores which receive inner telescoping members 72, 74 therein. Such an arrangement allows relative movement between tubes 42, 44 and 72, 74 while not substantially increasing the cross-sectional dimension they occupy. This is particularly the case where space in the vertical dimension is always a premium. It is appreciated that the length of inner telescoping members 72, 74 are contingent on the length of travel required for the slide-out section 4. Furthermore, with members 72, 74 attached to bracket 68 along with piston rod 56, they are configured to move in concert with piston rod 56.

In order to assist moving inner telescoping members 72, 74 in concert with piston rod 56, a timing assembly 75 is provided, illustratively located between cross-members 40, and 41, 41'. Timing assembly 75 illustratively comprises timing rods 77, 79, a timing cam assembly 80, pinions 82, 84 and racks 86, 88. The timing rods 77, 79 extend transversely to telescoping assemblies 24, 26 such that their axis of rotation 130 extends therethrough. (See also FIG. 5.) Support brackets 90, 92, 94 and 96 extend between cross-members 40 and 41, 41', and each have a bore disposed therethrough, through which other timing rods 77, 79 extend to support same. The timing cam assembly 80 is coupled to one end of each of the timing rods 77, 79 to properly calibrate movement of the rods as known by those skilled in the art. Illustratively opposite the timing cam assembly 80, rods 77, 79 also comprise pinions that, along with the rods, are rotatable with respect to assembly 22. It is contemplated that the gear teeth 98 of both pinions 82, 84 rotate in conjunction with each other. (See also FIG. 4.) In other words, as the piston rod 56 is caused to move in either direction 6 or 8 by actuator 50, the pinions 82, 84 rotate correspondingly to move inner telescoping members 72, 74 concurrently, thus, ensuring synchronized movement in directions 6 and 8 along the span of slide-out section 4.

Figure 4:
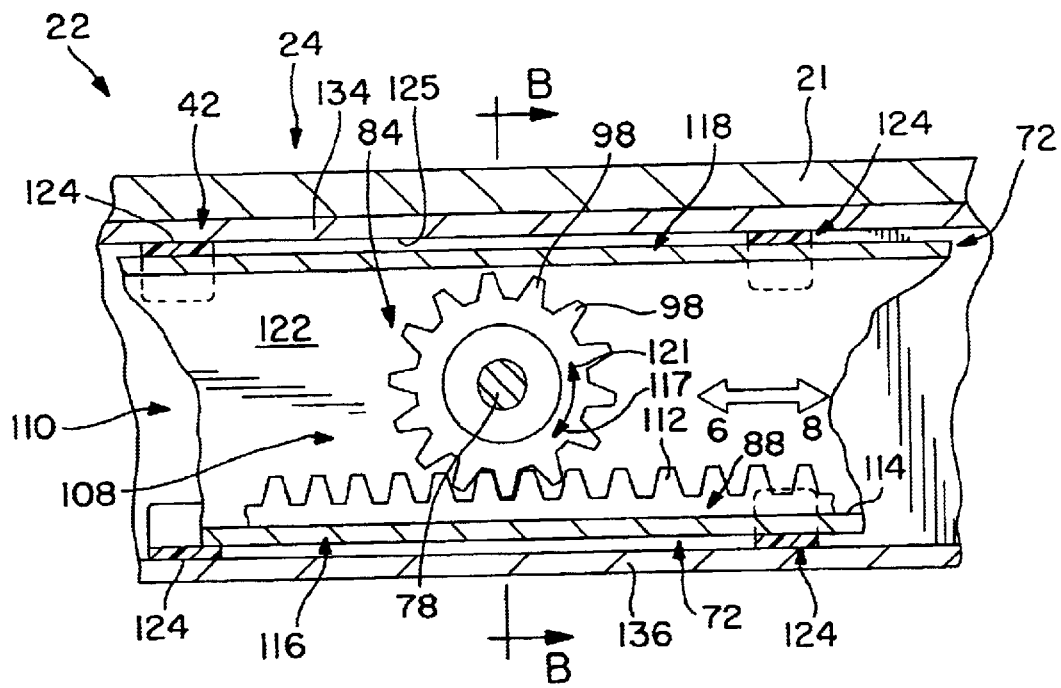
FIG. 4 is a cross-sectional view of a portion of the slide-out assembly of FIG. 1 taken along the line A—A of FIG. 3.
Figure 5:
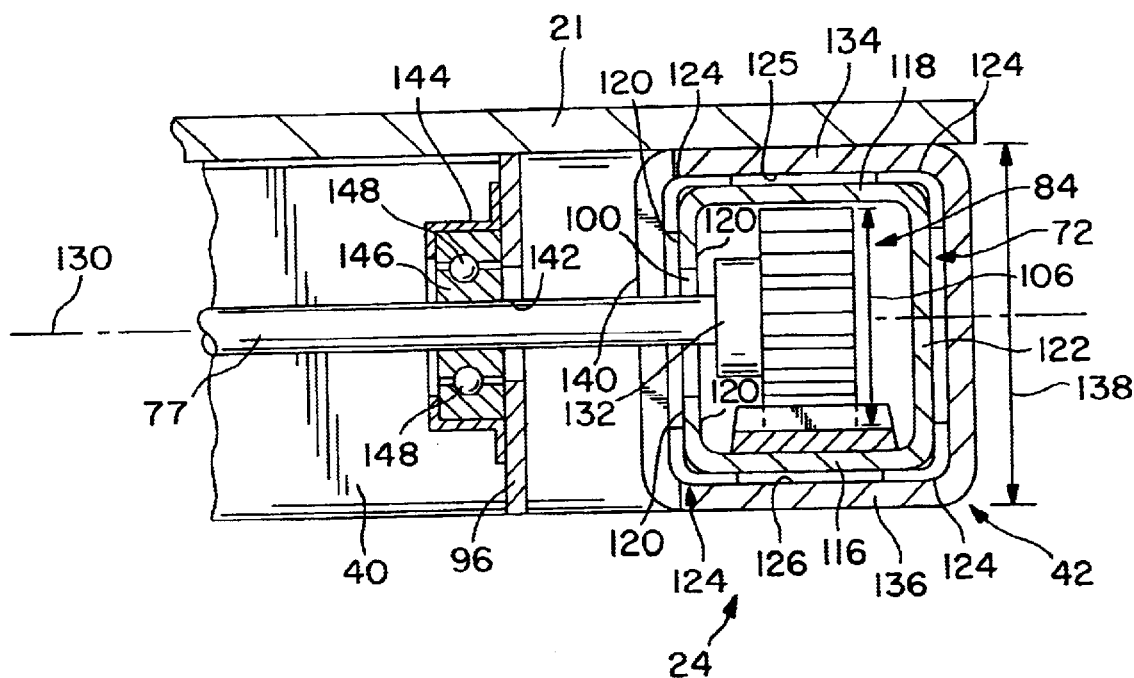
FIG. 5 is a cross-sectional view of a portion of the slide-out assembly of FIG. 1 taken along the line B—B of FIG. 4.

Pinions 82, 84 travel along racks 86, 88, respectively, as shown in FIGS. 3 through 5. Specifically shown in FIGS. 3 and 5, are pinions 82, 84 located inside assemblies 24, 26, respectively. This allows the axis of rotation 130 of rods 77, 79 to bisect assemblies 24, 26, thereby reducing the amount of space, particularly vertically, required to accommodate synchronization assembly 75. In the illustrated embodiment, each of the rods 77, 79 extend into slots 100, 100', respectively, each disposed in the inwardly facing, and upwardly extending side panels 120, 102 of inner telescoping member 72, 74, respectively. (See also FIG. 5.) Slots 100, 100' extend the length of members 72, 74, respectively, to the extent necessary to move slide-out section 4 a desired amount. It is contemplated, however, that rods 77, 79 may extend into any portion of assembly 24, 26, respectively. It is further contemplated that any mechanism can be used to synchronize members 72, 74 so long as the axis of rotation 130 or other definable axis extends through assemblies 24 and 26, or its vertical dimension is within the vertical dimensions of the assembly. Additionally, it is appreciated that structures like actuators, pulleys, or chain systems, for example, can be used in lieu of the rack and pinions as an alternative to synchronizing the movement of members 24, 26.

A side-looking cross-sectional view of a portion of telescoping assembly 24 is shown in FIG. 4. It is contemplated that even though only assembly 24 is shown in FIG. 4, such descriptions apply equally to assembly 26. As an illustrative embodiment, pinion 84 comprises a vertical dimension 106 which is located within space 108 of inner telescoping tube 72. Inner telescoping tube 72 is itself disposed in space 110 of tube 42. Rack 88, having plurality of teeth 112, is linearly plotted along the inner surface 114 of lower panel 116 of inner telescoping tube 72. Teeth 112 are configured to cooperatively engage teeth 98 of pinion 84, as shown in FIG. 4. As pinion 84 rotates in either direction 117, 121, teeth 98 engage teeth 112, causing rack 88 along with attached inner telescoping tube 72 to incrementally move in directions 6, 8, respectively. Movement of tube 72, along with tube 74, in directions 6, 8, therefore, moves the attached slide-out section 4 between retracted stowed and extended use positions. (See again, FIGS. 1, 2, and 3.)

As illustrated, lower and upper panels 116, 118, as well as side panels 120, 122 (See FIG. 3) ride a plurality of glide surfaces 124 attached to surfaces 125, 126 of outer tube 42. Surfaces 124 separate inner tube 72 from outer tube 42 while providing a friction-reduced glide surface upon which inner telescoping tube 72 can travel. Illustratively, surfaces 124 are made from a nylon material. It is appreciated, however, that any surface that does not impede the movement of the inner telescoping tubes with respect to the outer tubes can be used within the context of this application. For example, smooth surfaces, bearings, rollers, coatings, films, and the like, may be used as a glide surface or surfaces for the inner tubes. In addition, it is contemplated that the glide surface can be on any inner surface of outer tubes 42, 44, or outer surface of inner telescoping tubes 72, 74, and that such a surface or surfaces may extend continuously the length of the tubes or just a portion of, or intermittently along same.

A forward-looking cross-sectional view of a portion of telescoping assembly 24 is shown in FIG. 5. This illustrated embodiment shows the axis of rotation 130 of rod 77, which extends through outer tube 42. Additionally, pinion 84 is shown attached to rod 77 at coupling 132, and is located within outer tube 42, illustratively within inner telescoping tube 72 as well. Illustratively, because the vertical dimension 106 does not extend beyond top and bottom portions 134, 136 of outer tube 42, the vertical profile of the entire assembly is illustratively reduced to less than the vertical dimension of outer tube 42. As shown in FIG. 5, flooring 18 can be positioned adjacent outer tube 42. This reduction in vertical profile translates into space savings that can be used instead for other applications like expanding the slide-out section 4 or increasing the storage space below.

As also shown in FIG. 5, rod 77 extends through opening 140 in outer tube 42 and slot 100 disposed through inner telescoping tube 42 to attach to pinion 84. Rod 77 is also disposed through aperture 142 disposed through support bracket 96. A support bearing assembly 144 is illustratively attached to bracket 96 and about rod 77 to provide a bearing support to same. In the illustrated embodiment, bearing assembly 144 comprises a collar 146 and bearing members 148 to further assist the rotational movement of rod 77. It is appreciated, however, that support 96, as well as other associated structures, are illustrative, and alternatives to such are contemplated to be within the scope of this invention.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the invention as set forth in the following claims.

What is claimed is:

1. A vehicle, the vehicle having an expandable slide-out body movable relative to the vehicle by a slide-out apparatus, the slide-out apparatus comprising:

a first rail defining a first longitudinally-extending compartment;

wherein the first rail is attached to the vehicle;

a second rail having a second longitudinally-extending compartment;

wherein the second rail is attached to the slide-out body, and is disposed within and movable relative to the first longitudinally-extending compartment;

a bracket attached to the second rail;

an actuator that selectively moves the bracket;

wherein movement of the bracket moves the second rail relative to the first rail;

a first synchronization member attached to the second rail; and a second synchronization member located inside the second longitudinally-extending compartment and is engagable with the first synchronization member.

2. The vehicle of claim 1, wherein the first synchronization member is attached longitudinally to the second longitudinally-extending compartment.

3. The vehicle of claim 1, wherein the first synchronization member is a rack.

4. The vehicle of claim 1, wherein the second synchronization member is a gear located inside the second longitudinally-extending compartment.

5. The vehicle of claim 4, wherein the gear has an axis of rotation that intersects the first rail.

6. The vehicle of claim 1, wherein the second rail comprises a longitudinally-extending opening configured to receive a timing member that is attached to the second synchronization member.

7. A vehicle, the vehicle having an expandable slide-out body movable relative to the vehicle by a slide-out apparatus, the slide-out apparatus comprising:

a first rail attached to the vehicle, wherein the first rail having a first longitudinally-extending tubular compartment;

a second rail attached to the slide-out body, and disposed within and movable relative to the first longitudinally-extending tubular compartment;

wherein the second rail has a second longitudinally-extending tubular compartment defined by longitudinally-extending spaced-apart upper and lower walls; and a synchronization assembly located within the second longitudinally-extending tubular compartment between the upper and lower walls.

8. The vehicle of claim 7, wherein the synchronization assembly comprises a corresponding rack and a pinion.

9. The vehicle of claim 8, wherein the rack is attached longitudinally to the second rail and the pinion is rotatable and engagable with the rack moving same as the pinion rotates.

10. The vehicle of claim 9, wherein the pinion has an axis of rotation that intersects the first rail.

11. The vehicle of claim 7, wherein a timing member extends into the first and second rails and is attached to at least a portion of the synchronization assembly.

12. A vehicle, the vehicle having an expandable slide-out body movable relative to the vehicle by a slide-out apparatus, the slide-out apparatus comprising:

a plurality of first rails, each attached to the vehicle, wherein each of the plurality first rails having a first longitudinally-extending compartment;

a plurality of second rails, each having a second longitudinally-extending compartment, and each attached to the slide-out body and each disposed within and movable relative to one of the first longitudinally-extending compartments of each of the plurality of first rails;

a plurality of first synchronization members, each attached to the second longitudinally-extending compartment of each of the second rails;

a plurality of second synchronization members each located inside each of the second longitudinally-extending compartments and each is engagable with the at least one of the first synchronization members; and a timing member attached to each of the plurality of second synchronization members;

wherein the timing member extends into a longitudinally-extending slot disposed in each of the plurality of second rails to provide access to the second longitudinally-extending compartments.

13. The vehicle of claim 12, wherein the timing member defines a longitudinal axis which intersects at least one of the first rails.

14. The vehicle of claim 12, wherein each of the first synchronization members are racks.

15. The vehicle of claim 14, wherein each of the plurality of second synchronization members are rotatable pinions.

16. The vehicle of claim 15, wherein the timing member is attached to each of the rotatable pinions such that as each of the pinions rotate, they engage each of the racks, causing the second rail to move relative to the first rail, and the timing member causes each of the pinions to move concurrently.

17. The vehicle of claim 12, wherein the timing member is disposed through each of the first rails.

18. The vehicle of claim 15, each of the pinions are each located entirely in one of the second longitudinally-extending compartments of each of the plurality of second rails.

* * * * *